Figure 1:
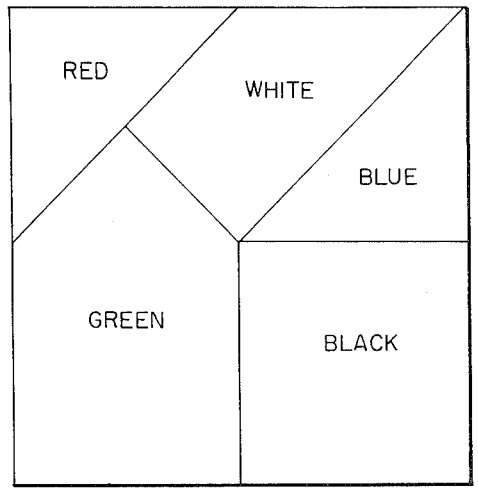

United States Patent [19]
Shenker

[11] 3,923,388
[45] Dec. 2, 1975

[54] METHOD AND APPARATUS FOR THE PRODUCTION OF COLORED DESIGNS

[75] Inventor: Nathan Shenker, Brooklyn, N.Y.

[73] Assignee: Tech/Ops Massachusetts, Burlington, Mass.

[22] Filed: Mar. 6, 1974

[21] Appl. No.: 448,463

[52] U.S. Cl. .................. 353/30; 353/20; 353/84
[51] Int. Cl.² .................................. G03B 21/26
[58] Field of Search ............ 353/20, 31, 30, 32, 33, 353/34, 84

[56] References Cited
UNITED STATES PATENTS

| | | | |
|---|---|---|---|
| 1,788,135 | 1/1931 | Twyman et al. | 353/84 |
| 2,591,428 | 4/1952 | Harris et al. | 353/31 |
| 3,600,087 | 8/1971 | Goodman | 355/32 |
| 3,644,019 | 2/1972 | Bestenreiner et al. | 353/20 |

OTHER PUBLICATIONS

P. F. Mueller, *Color Image Retrieval from Monochrome Transparencies*, Oct. 1969, Vol. 8, No. 10, p. 2051 Applied Optics.

J. D. Armitage et al., *Theta Modulation in Optics*, Apr. 1965, Vol. 4, p. 399 Applied Optics.

*Primary Examiner*—Richard E. Aegerter
*Assistant Examiner*—John W. Shepperd
*Attorney, Agent, or Firm*—Gottlieb, Rackman, Reisman, & Kirsch

[57] ABSTRACT

There is disclosed a method and apparatus for improving the production of colored designs as described in application Ser. No. 399,367. In the apparatus disclosed in that application, mutually exclusive areas or zones of the replica of a pattern are encoded differently so that light projected through each zone can be processed separately from light projected through the other areas. In this manner, each zone in a projected pattern may be given an arbitrary hue and intensity. In order to facilitate the association of the actual colors in a projected design with the individual color-controlling channels, in accordance with the present invention a separate "color block" is provided as part of each zone. The color blocks are not parts of the pattern of interest but because the color blocks have a fixed association with the color-controlling channels, the color controlled by each channel can be determined visually.

3 Claims, 7 Drawing Figures

METHOD AND APPARATUS FOR THE PRODUCTION OF COLORED DESIGNS

This invention relates to a method and apparatus for facilitating the adjustment of colors in a projected pattern in which the individual colors of separate zones can be varied.

In the co-pending application of Albert Ernest Smith, Ser. No. 399,367 filed Sept. 21, 1973 and entitled "Production of Colored Designs", there is disclosed a method and apparatus for producing a pattern of adjustably colored zones. A projected pattern is identical to an original one except that for each color in the original a different and unrelated color may appear in the projected pattern. Apparatus of the type described is particularly useful in the textile industry. For example, it allows a designer to produce a fabric with one color combination, and to economically explore and specify other color variations of the same design.

As set forth in the Smith application, one way of achieving this objective, as proposed in the prior art such as Twyman et al U.S. Pat. No. 1,788,135, was to take a separate photographic negative of each differently colored area of a basic design (in which each differently colored area could and usually would comprise many disjointed sub-areas) and to produce a set of positive transparencies from the negatives. Separate beams of light could then be projected through the several positives so as to reproduce the configuration of the basic design, and the colors of the individual beams could be changed in order to experiment with different color variations for the overall design.

To avoid the registration problems inherent in such a scheme, in the above-identified application there is disclosed a method and apparatus for achieving the same result (with up to five differently colored areas) by using only a single positive transparency. Each color component (or zone) in the original pattern is encoded on the same record, but with a unique spatial carrier. This record, a positive transparency, can then be used in Fourier-transform optical reconstruction apparatus to provide an optical image of the original pattern in which each component can be arbitrarily colored by properly locating selected filters in the paths of respective light beams.

In the actual use of the apparatus, a color filter is placed in the path of each light beam which is used to illuminate the composite spatial carrier. This causes the respective area in the reproduced pattern to have the color of the respective filter. In the color design process, a designer may look at the reproduced pattern and decide to change the red area to pink. All that is required is to replace the red filter in the path of the respective light beam by a pink filter. Many color combinations can be tried until a final color combination is decided upon. At this time, the five final colors may be listed together with the individual zones in the original pattern with which they are associated. Thereafter, a textile fabric can be produced based on the selected color combination.

In actual practice, however, this procedure does not lend itself to rapid color changes, nor is it foolproof in the sense that an ultimately produced textile fabric will convey the same visual impression as did the finally selected color combination. The two problems arise for different reasons.

The original fabric which is used in the photographic process for making the spatial carrier has up to five colors in it, e.g., red, blue, green, white and black. These colors do not necessarily have any relation to the final color combination. The five colors in the original fabric are simply used to identify five different color zones, or areas, in the pattern. It is the color filters used in the projection apparatus which solely determine the colors in the final combination. Thus during the color selection process, a designer may first select a pink color for the originally red area in the pattern. Thereafter, yellow may be tried. Colors in other zones may then be varied, and the designer may decide subsequently to try orange instead of yellow for the originally red zone.

The problem which arises is how to determine which filter should be changed, that is, in which of the five light beams should a new filter replace an old one — without visually examining the filters themselves. Simply to specify an order such as "change yellow to orange" is not enough because without looking at the filters it may not be known which filter is yellow. Similarly, it is not sufficient to specify that "the originally red area should be changed to orange" because it may no longer be recalled which original area (e.g., red, blue, etc.) is now colored yellow (the color to be changed). This is especially true when up to five colors are being varied continuously during the design process. In order for the apparatus to be used conveniently, what is required is some way to rapidly identify the light beam (channel) whose filter should be changed to the newly specified color.

The problem just described pertains to the convenience of the use of the apparatus. The other problem relates to the end result; after a color combination is finally decided upon and a fabric is produced accordingly, it may be found that the fabric does not look exactly like the one selected during use of the apparatus. The reason for this is that the individual sub-areas of each zone are often very small. In the case of textile patterns, individual sub-areas may be no bigger than a single stitch. A color which the designer "sees" in the projected pattern may not be the true color. This is because the color perceived by the eye of an observer is influenced by the colors of the surrounding areas. This is especially true in the case of very small areas. Thus, while an observer may "see" a pink color of one hue, the actual color which is projected may really be a pink of a slightly different hue. In order for a produced fabric to convey the same image as that of the projection, the pink hue which is used for the fabric must be identical to the true pink hue in the projection, and not the perceived hue. The problem, then, is that the designer may not be able to correctly identify the color or hue to be used for a particular zone from the projected image itself. (Of course, after a final color combination is selected, the filters could be examined individually. But this may not be sufficient. For example, each filter may actually comprise a combination of filters. In such a case, the only practical way to identify a color may be by looking at it in the final image, and perhaps matching it against a color in a color chart. And the surrounding colored areas may make it impossible to correctly match the color of an area with one on a color chart.)

Instead of using color filters, each light beam may be formed by combining selected percentages of light from three primary light sources. The percentages, or primary color components, might be varied by changing neutral density filters in each component path. In this way, a "true" color could be specified by noting the color coordinates of each light beam. But if such a technique is used, it in no way solves the first problem; it still takes time to identify the channel which is the source of a particular color in the observed image. And when one considers that dozens of color changes may be required before a final combination is settled upon, it is apparent that rapid identification of the channel (one of five light beams) responsible for a particular projected color is a highly desirable feature.

In accordance with the principles of my invention, I provide for the projection of separate "blocks" of color adjacent to the projected pattern. Five blocks may be arranged at the bottom of the pattern from left to right. Each block is associated with one of the five zones in the original pattern. In the illustrative embodiment of the invention, each block encoded on the record (a positive transparency) has a spatial carrier which is the same as that of the respective zone in the pattern. In this manner, whenever any zone has its color changed, the color of the respective block is changed in the same way.

Each color block is thus associated with and is actually formed by one of the five light beams. (Instead of using blocks of color alone, the respective numerals 1–5, or letters A–E, may be projected along with them. It is even possible to project numerals or letters alone.) If it is now desired, for example, to change an orange color in the projection to a yellow color, all that has to be done is to look at the block under the pattern which has the orange color. If it is the third block which is orange, for example, then it is the color produced by channel 3 of the projector which must be changed. The apparatus is thus far more convenient to use. A designer need not remember which channel is controlling which color. The color blocks at the bottom of the projected image identify the channels by the colors for which they are responsible.

And insofar as the proper identification of colors is concerned after a final design is selected, it is the blocks at the bottom of the image which can be observed to determine true colors. Even if the individual sub-areas in the image are very small, the color blocks at the bottom of the image are not. The colors of these blocks are not only the true colors, but they are perceived as such. Thus the true colors can be identified with little difficulty.

It is a feature of my invention to provide, in conjunction with the image of a pattern, a relatively large area associated with each zone of the image, the color of each of these areas being the same as the color of its respective zone and each of these areas being associated with one of the color-producing channels of the image forming apparatus.

Figure 2:
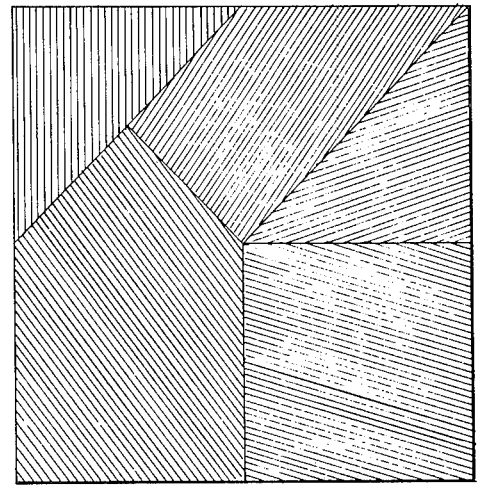
Figure 3:
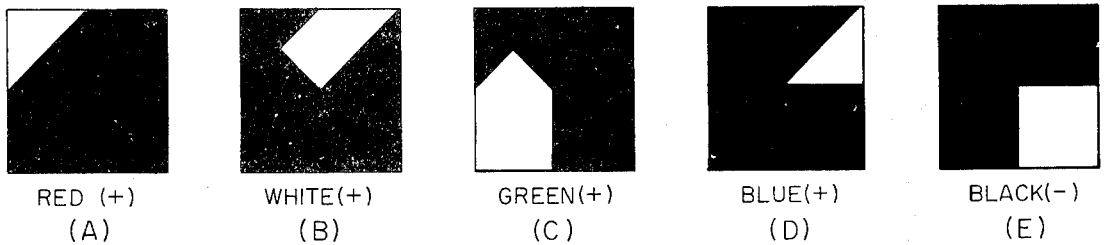
Figure 6:
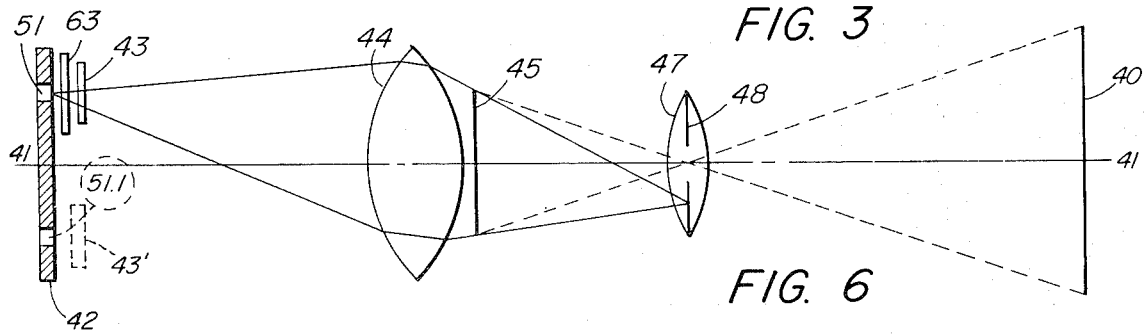
Figure 6A:
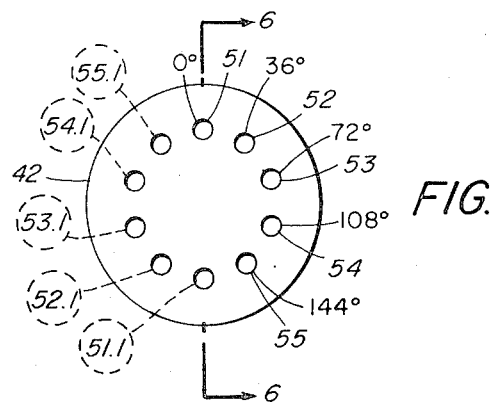
Figure 5:
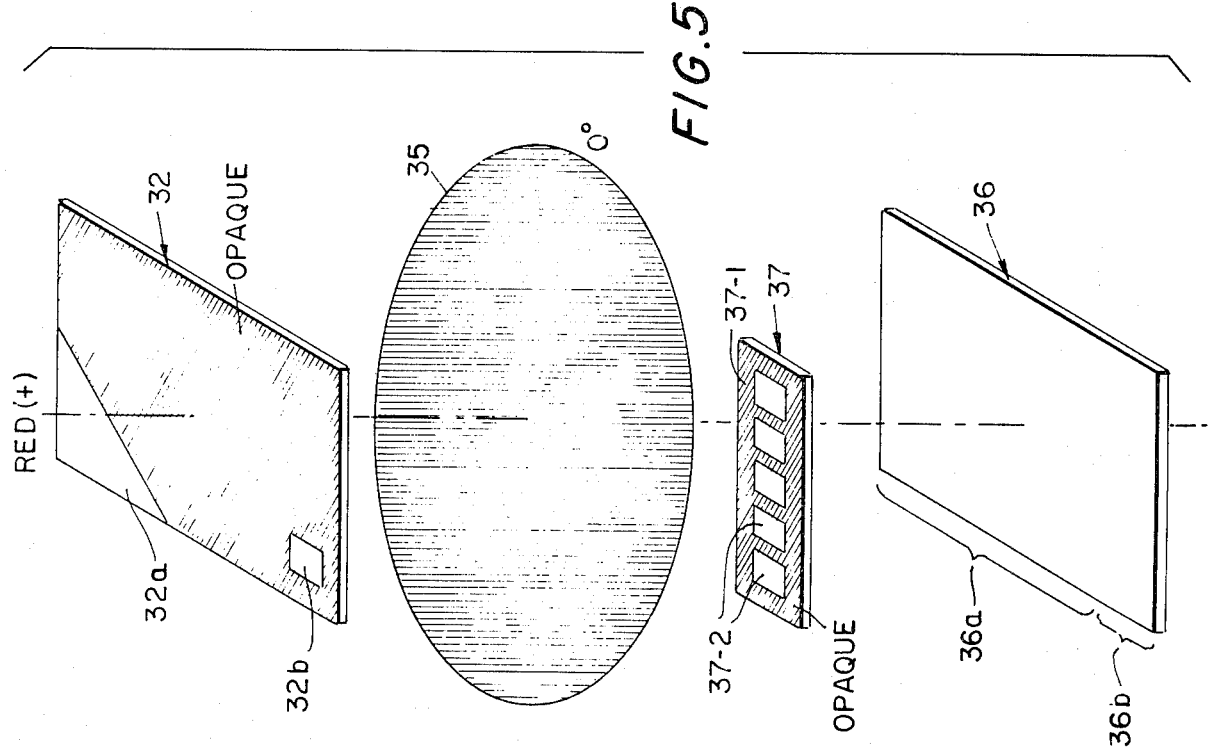
Figure 4:
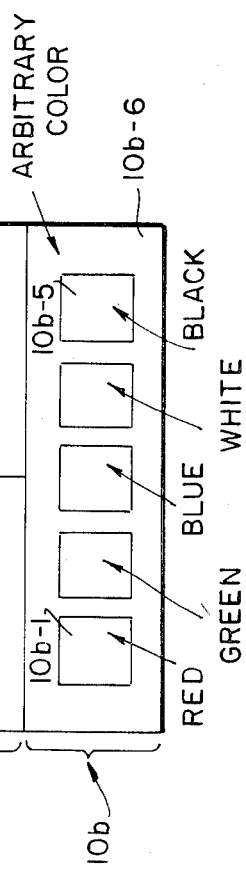

Further objects, features and advantages of my invention will become apparent upon consideration of the following detailed description in conjunction with the drawing, in which:

FIGS. 1, 2 and 3 are identical to the samenumbered figures in the Smith et al application, with FIG. 1 schematically illustrating an original pattern or design having separate zones, each of which has a different color, FIG. 2 schematically illustrating a transparency replica of FIG. 1 in which each zone is uniquely spatially coded, and FIG. 3 representing a group of intermediate transparencies each of which represents one of the zones of FIG. 1;

FIG. 4 schematically illustrates the same original pattern as FIG. 1, but has added to it blocks of color from which the color block projections can be derived;

FIG. 5 illustrates a sub-step in the process flow for producing a spatially-encoded replica of the pattern of FIG. 4 from intermediate transparencies, FIG. 5 being identical to a corresponding sub-step depicted in FIG. 5 of the Smith application but with a modification to be described below; and FIGS. 6 and 6A are identical to the samenumbered figures in the Smith application and schematically illustrate an optical Fourier-transform apparatus for reproducing a replica of the pattern of FIG. 4 with the color of each zone and its corresponding block being variable.

FIG. 1 shows in a simplified way a fabric design or a pattern of differently colored components occupying mutually exclusive areas of the total pattern. In this instance, five colors are shown. These are red, blue and green, and white and black which, for present purposes, are regarded as colors. The pattern, therefore, has five differently colored components, each occupying exclusively an area of the pattern. In practice these colored components will normally be intermixed in a much more complex manner, especially in the case of a fabric in which each color will be that of an individual thread or group of threads.

FIG. 2 is a "black-and-white" replica of the original pattern in which each colored component is encoded with a different spatial carrier. Thus, in FIG. 2 each of the original zones in the pattern is represented by a diffraction grating oriented at a unique angle relative to the diffraction gratings that represent the other zones. There being five different color components in the original pattern, it is convenient to space the gratings about in azimuth by 36°. Illumination of the transparency of FIG. 2 in a reconstruction and projection system of the Fourier-transform type, as is described and illustrated, for example, in U.S. Pat. No. 3,561,859, will enable diffracted light from each of the zones in the replica to be separately located in Fourier-transform space. Thus each of five light beams projected through the transparency of FIG. 2 can be arbitrarily colored with the use of a filter or filters, as will be explained below, and then the entire pattern can be reassembled optically with each zone bearing an arbitrarily assigned color. In this manner, using a single replica of the original pattern, a designer can examine with facility a virtually infinite variety of color combinations for that pattern.

The creation of the spatially-encoded replica of the original design is based on a group of intermediate transparencies (FIG. 3) which can be made by techniques that are known, for example, from U.S. Pat. No. 1,788,135, issued Jan. 6, 1939 to F. Twyman et al. FIG. 3 shows five separate transparencies, labelled (A) through (E), respectively, FIG. 3A is a black-and-white transparency in the form of a photographic positive of the red zone of FIG. 1. The portion corresponding to the red zone is transparent while the rest of FIG. 3A is opaque. In FIG. 3B also a photographic transparency, the portion corresponding to the white zone of FIG. 1 is transparent, the remainder being opaque. In FIG. 3C, there is shown a green positive in which the portion corresponding to the green zone of FIG. 1 is transparent and the remainder is opaque. In FIG. 3(D), a blue positive, the portion corresponding to the blue zone of FIG. 1 is transparent and the remainder is opaque. FIG. 3(E) shows a black negative in which the portion corresponding to the black zone of FIG. 1 is transparent and the remainder is opaque.

FIG. 4 in the Smith application depicts in block diagram form the general process flow for producing the intermediate transparencies of FIG. 3. The detailed steps are not important for an understanding of the present invention, and for this reason FIG. 4 of the Smith application is not included herein. In fact, rather than to use purely photographic techniques, the individual transparencies may be formed by electronically scanning the original pattern. In such a case, one scan may be made for each color zone to derive a corresponding display from which a transparency is made, a technique known to those skilled in the art.

FIG. 5 in the Smith application (not shown herein) illustrates schematically the printing step (consisting of five sub-steps) in which the spatially encoded transparency of FIG. 2 is made. FIG. 5 of the present drawing depicts the first of five sub-steps in the printing step of my invention. Although FIG. 5 illustrates the use of an additional mask 37, as will be described below, in the following discussion of the prior art Smith technique, mask 37 should be ignored.

As shown in FIG. 5, the red (black-and-white) transparency 32, the diffraction grating 35 (having 200 lines per millimeter), and the photographic receptor 36 are aligned for contact printing, with the grating oriented at 0°. After exposure of the receptor through the red positive and the grating, another of the transparencies of FIG. 3 is used, with the grating being turned 36°. As depicted most clearly in FIG. 5 of the Smith application, five successive exposures of the photographic receptor 36 are made using the five transparencies of FIG. 3, with the grating being rotated by 36° for each exposure. The net result is that each zone in the original pattern is printed on a separate and unique area of the receptor, with the spatial carrier for each zone being oriented differently. The receptor 36 is preferably a black-and-white photographic material characterized by high resolution properties, and it is processed to produce a black-and-white transparency having the image configuration shown in FIG. 2.

FIGS. 6 and 6A show an optical display system, similar in principle to that of U.S. Pat. No. 3,561,859, which may be used to project on a screen 40 an image of the original pattern or design shown in FIG. 1, and in which each of the separate zones may be given any desired color, in any desired hue and intensity. The system is arranged along an optic axis 41—41. The principal components shown along the axis are a light-source mask 42, color filters 43, a transform lens 44, a slide or transparency 45 which corresponds to the encoded pattern replica of FIG. 2, a projection lens 47 fitted with a stop 48, and the screen 40.

The light source mask 42 is shown in plan view in FIG. 6A. To simplify the illustration it is shown as a disc of preferably opaque material having an array of light source apertures 51, 52, 53, 54 and 55 through it. These apertures are arrayed on an arc and spaced 36° apart between pairs of adjacent apertures. Each aperture is at the location of a light source for one of the zones in the pattern, and the angular spacing between apertures corresponds to the angular spacing between grating lines encoding each of the zones. Those skilled in the art will recognize that each light source aperture 51–55, respectively, can have a cognate light source aperture 51.1 – 55.1, respectively, located diametrically opposite it in the disc 42. Likewise, those having such skill will realize that light can be supplied in the apertures either by locating individual lamps in them, or by bringing light into them from a remote source or sources via fiber-optic conductors, as two well-known examples. In any event, the aperture or pair of apertures locating the light source for each zone is fitted with spectral filter means to impart the desired color or hue to that zone. A filter 43 (or a pair of filters 43, 43') is shown in FIG. 6 in the path of light from and first (0°) light source aperture 51 (and its cognate aperture 51.1 if used), which lies in the longitudinal plane of the illustration and includes the axis 41–41. If desired, a neutral density filter, 63 for example, can be included in each light path in order to control the intensity of lgiht in each zone.

If the light source aperture 51 labelled 0° in FIG. 6A is assumed to be located on a diameter running vertically through the disc 42 as seen in FIGS. 6 and 6A, then the transparency 45 will be placed in the system oriented about the axis 41-41 so that the encoded grating lines of the zone that is cooperatively related to that aperture will be disposed horizontally, that is 90° around the axis relative to that vertical diameter. For convenience, assume that the originally-red zone is chosen to have its grating lines oriented horizontally in the display system. Then, as is taught in U.S. Pat. No. 3,561,859, first-order light of the diffraction pattern of the grating encoding that zone will pass on-axis through the projection lens stop 48, and zero-order light will be blocked by the stop. An image of the originally-red zone will be formed on the screen, and this image will look like the red (+) transparency of FIG. 3A. However, with the spectral filter 43, this image can be given any desired color or hue, and with the neutral density filter it can be given any desired intensity.

In like manner, light source aperture 52 and appropriate filter means (not shown) can be used to reconstruct the originally-white zone of the pattern or design in any desired color or hue, and intensity, light source aperture 53 can be used to construct the originallyblue colored zone in any desired color or hue, and intensity, and so forth. As is known to those skilled in the art, the grating lines that are used to encode the separated zones of the original design or pattern will not appear in the composite image reconstructed on the screen 40, or in any zonal components of it.

In accordance with the principles of the present invention, in the illustrative embodiment thereof, the original fabric 10 (see FIG. 4) includes a first part 10a corresponding to the fabric of FIG. 1, and an additional part 10b. Part 10a is identical to the fabric of FIG. 1, it is the pattern which is to be reproduced, and it includes, for example, five differently colored zones 10a-1 thorough 10a-5. Part 10b consists of five blocks 10b-1 through 10b-5, whose colors are identical to respective colors in fabric part 10a. The border 10b-6 around the five blocks 10b-1 through 10b-5 can be of any arbitrary color.

When the fabric of FIG. 4 is processed in accordance with the Smith teaching, five transparencies corresponding to those shown in FIG. 3 are produced. Each of these transparencies is identical to a corresponding transparency shown in FIG. 3, but each transparency further includes a part corresponding to part 10b of FIG. 4. In the red transparency, the four blocks 10b-2 thorugh 10b-6 are opaque, and the red block 10b-1 is transparent. That is because the red block 10b-1 is a part of the red zone of the overall pattern of FIG. 4. As for the border 10b-6 in the transparency corresponding to that of FIG. 3(A), the border is transparent or opaque depending on the color of the original pattern in the border 10b-6 of FIG. 4. As will be described below, the border is masked out in the final step of the process so that it makes no difference whether the border in the intermediate red transparency is clear or opaque.

In a similar manner, the white transparency corresponding to that of FIG. 3B includes an additional part which is clear in the area of the white block 10b-4 and is opaque in the areas of the other four blocks. Again, the border in the transparency corresponding to border 10b-6 in FIG. 4 may be clear or opaque. (It will be clear only if the border is white in the original fabric.)

In a similar manner, three other transparencies are made. Each of these transparencies has a clear block in its bottom part, the transparency being opaque in the areas corresponding to the other four blocks in the bottom part 10b of FIG. 4. Assuming that the border 10b-6 in the original fabric has one of the five colors used in the rest of the fabric, four of the transparencies will have opaque borders and one will have a clear border.

FIG. 5 depicts the first of the five sub-steps performed in the exposure of the photographic receptor 36. The upper part 36a which is exposed corresponds to part 10a of the fabric (more particularly, the red transparency of FIG. 3A), and the additional part 36b corresponds to the additional fabric part 10b. As shown in FIG. 5, the red transparency includes a clear area 32a corresponding to the red zone in the original pattern 10a, and a clear block 32b corresponding to the red block 10b-1 in the original fabric. (Because the border in the transparency 32 is opaque, that is an indication that the "arbitrary" color of the border in FIG. 4 is not red.) Each exposure of the photographic receptor is made through a differently oriented grating 35 just as it is in the practice of the Smith invention.

The major difference is the use of a mask 37 which is placed directly above portion 36b of the photographic receptor 36. This mask is opaque as shown by the designation 37-1, except for five clear blocks 37-2. When the red transparency is used to expose the photographic receptor, the only part of the photographic receptor within area 36b which is exposed is that directly underneath the leftmost clear block 37-2. Thus the spatial carrier for the red block in the encoded replica is the same as that for the red zone in the fabric design. As successive transparencies are used to expose the photographic receptor, five different grating patterns appear in respective blocks at the bottom of the photographic receptor. The reason for utilizing mask 37 is to ensure that the border around the five blocks in part 36b of the photographic receptor is not exposed. Even though one of the transparencies, such as transparency 32, may have a clear border (if the color of the border 10b-6 in FIG. 4 is the same as one of the five colors in the fabric pattern), mask 37 blocks the light which would otherwise expose a border in the photographic receptor.

The final transparency which is used in the projection apparatus of FIGS. 6 and 6A is identical to that of FIG. 2, except for the addition of a bottom part having five blocks with respective encodings corresponding to the five areas shown in FIG. 2. The border around these five blocks is opaque so that no light is transmitted through it to the screen. Thus what appears on the screen is a five-color pattern (depending on the filters placed in the paths of the respective light beams) together with five blocks of color at the bottom of the pattern, with the color of each block being the true color of a respective zone in the pattern. The original grating orientations determine which channel (light source) controls the illumination of each block. The channels may be numbered, e.g., 1 though 5, so as to correspond to the color blocks from left to right.

It is thus very simple to identify a channel whose filter is to be changed during the design selection process. For example, suppose that the third color block at the bottom of a projected pattern is pink. It is totally irrelevant that the respective zone in the original pattern was blue (see FIG. 4). All that matters now is that the pink color is being derived from a pink filter in the third channel of the projection apparatus. A designer can call for a change such as "pink to purple"; the operator is immediately aware of the fact that the pink color is being projected by the third channel of the apparatus, and that the filter in this channel should now be replaced by a purple filter.

Although the invention has been described with reference to a particular embodiment it is to be understood that this embodiment is merely illustrative of the principles of the invention. For example, the mask 37 of FIG. 5 may include opaque numerals 1-5 in the five transparent blocks 37-2. In this manner, the channel which is producing each color on the screen is immediately identified by number. Furthermore, instead of using mask 37 in the making of the encoded replica, it can be used during projection to block light from a border around the color blocks. There are also alternative techniques for forming the five encoded color blocks without actually including an additional part 10b in the fabric (FIG. 4). For example, if transparencies corresponding to those of FIG. 3 are made, each of them will be opaque in its bottom part. A "color block" can be made simply by removing the coating of a small block of the unexposed film corresponding to one of the blocks 10b-1 through 10b-5 in FIG. 4. It is also contemplated that if instead of using a single spatially encoded carrier, five projection transparencies are used, each would have a respective transparent block to serve the same purpose as each of the blocks described above. It is also possible to omit the five encoded blocks from the single spatially-encoded carrier, or from the five separate transparencies. Instead, a separate mechanism may be provided to project a portion of the light produced in each channel directly to the display to form a respective block. Similar color blocks may be formed in other types of displays, e.g., cathode ray tube Also, the principles of the invention are equally applicable to situations in which any number of color zones are used. Thus it is to be understood that numerous modifications may be made in the illustrative embodiment of the invention and other arrangements may be devised without departing from the spirit and scope of the invention.

What I claim is:

1. In the combination of a set of spatially encoded pattern replicas and an optical display system; each of said replicas being associated with and representing a different multi-color pattern and each of said replicas utilizing a respective one of several predetermined spatial codes for representing each area on the associated pattern which is of a uniform color; said optical display system being operative to form a color display of the pattern represented by a selected one of said replicas and having a plurality of color controlling channels, each color controlling channel being operative to vary the color in said display of that area which is represented by a spatial code which is uniquely associated with said each color controlling channel; the improvement comprising an additional spatially encoded area on each of said replicas for representing the identical information, independent of the different patterns represented by said replicas, each of said additional areas having a plurality of sub-areas arranged in the same sequence with the samepositioned sub-area on each replica utilizing the same respective one of said spatial codes so that all of the samepositioned sub-areas in the additional spatially encoded area on all replicas are uniquely associated with controlling channel.

2. A combination comprising an optical display system for use in varying and selecting a color combination for an arbitrary pattern of interest, and a set of pattern replicas consisting of first means for representing each area of the pattern which is to be of the same uniform color, and second means for representing a plurality of separate areas which are distinct from the pattern represented by said first means; said optical display system including means cooperating with said first means for forming a first display in which individual areas correspond to respective areas represented by said first means, and cooperating with said second means for forming a second display having a plurality of separate areas each corresponding to a respective area represented by said second means; and a plurality of means each for selectively controlling the color of a respective individual area in said first display, each of said color controlling means being uniquely associated with a respective one of the separate areas formed in said second display, independent of the pattern represented by said first means, and being operative to control the color of the associated area in said second display to be the same as the color of the area in said first display controlled by said each color controlling means so that the particular color controlling means responsible for each color in said first display can be determined by inspection of the separate area in said second display whose color is the same as said each color.

3. The combination in accordance with claim 2 wherein said first means includes a spatially-encoded replica of the pattern, in which each area of said first means corresponds to an area of the pattern which is to be of the same uniform color and has a different spatial carrier, and said second means includes a plurality of separate areas each associated with one of said color controlling means and each being spatially encoded in the same manner as one of the areas in said replica.

* * * * *